(12) United States Patent
Hittig et al.

(10) Patent No.: US 10,738,679 B2
(45) Date of Patent: Aug. 11, 2020

(54) USE OF A LUBRICATION OIL THAT FORMS WATER-SOLUBLE ASH WHEN COMBUSTED, ENGINE SYSTEM IN WHICH THE OIL IS USED AND A VEHICLE COMPRISING THE ENGINE SYSTEM

(71) Applicant: Scania CV AB, Södertälje (SE)

(72) Inventors: Henrik Hittig, Södertälje (SE); Mattias Berger, Mariefred (SE); Ulf Nylén, Rönninge (SE); Håkan Sarby, Huddinge (SE); Jonas Aspfors, Nykvarn (SE); Hanna Lind, Hägersten (SE); Klas Olofsson, Mariefred (SE); Daniel Hjortborg, Rönninge (SE)

(73) Assignee: Scania CV AB, Södertälje (SE)

( * ) Notice: Subject to any disclaimer, the term of this patent is extended or adjusted under 35 U.S.C. 154(b) by 28 days.

(21) Appl. No.: 16/075,480

(22) PCT Filed: Jan. 19, 2017

(86) PCT No.: PCT/SE2017/050049
§ 371 (c)(1),
(2) Date: Aug. 3, 2018

(87) PCT Pub. No.: WO2017/138858
PCT Pub. Date: Aug. 17, 2017

(65) Prior Publication Data
US 2019/0040785 A1 Feb. 7, 2019

(30) Foreign Application Priority Data

Feb. 11, 2016 (SE) ...................................... 1650173

(51) Int. Cl.
*F01N 13/00* (2010.01)
*F01N 3/20* (2006.01)
(Continued)

(52) U.S. Cl.
CPC ............ *F01N 13/011* (2014.06); *F01N 3/023* (2013.01); *F01N 3/0232* (2013.01); *F01N 3/04* (2013.01);
(Continued)

(58) Field of Classification Search
CPC combination set(s) only.
See application file for complete search history.

(56) References Cited

U.S. PATENT DOCUMENTS 9,003,773 B2 * 4/2015 Larose, Jr. .............. F01N 3/021
60/286
9,011,569 B2 * 4/2015 Otsuki ............... B01D 46/2418
422/169
(Continued)

FOREIGN PATENT DOCUMENTS

DE 4313132 A1 10/1994
EP 1630369 A2 3/2006
(Continued)

OTHER PUBLICATIONS

Swedish Office Action for Swedish Patent Application No. 1650173-6 dated Sep. 25, 2016.
(Continued)

*Primary Examiner* — Binh Q Tran
(74) *Attorney, Agent, or Firm* — Moore & Van Allen PLLC; W. Kevin Ransom (57) ABSTRACT

The present invention relates to use of a lubrication oil that forms water-soluble ash when combusted in an engine system, where the engine system comprises an internal combustion engine; an exhaust gas system comprising a diesel particulate filter to capture particulate matter from the exhaust gases, including the water-soluble ash; and an exhaust gas conduit to lead exhaust gases from the internal combustion engine to the exhaust gas system, and to collect
(Continued)

condensed water formed by a cold start and/or a cold operation of the internal combustion engine and lead the condensed water through the diesel particulate filter, thereby dissolving and removing the water-soluble ash from the diesel particulate filter.

19 Claims, 4 Drawing Sheets

(51) Int. Cl.
*F01N 3/023* (2006.01)
*F01N 3/04* (2006.01)
*F01N 9/00* (2006.01)
*F01N 3/22* (2006.01)

(52) U.S. Cl.
CPC ........... *F01N 3/2066* (2013.01); *F01N 3/225* (2013.01); *F01N 9/002* (2013.01); *F01N 9/007* (2013.01); *F01N 2240/22* (2013.01); *F01N 2610/00* (2013.01); *Y02A 50/2325* (2018.01); *Y02T 10/24* (2013.01); *Y02T 10/47* (2013.01)

(56) References Cited

U.S. PATENT DOCUMENTS

| | | |
|---|---|---|
| 2005/0022668 A1 | 2/2005 | Cairns |
| 2006/0266023 A1 | 11/2006 | Boegner et al. |
| 2007/0129266 A1 | 6/2007 | Busse et al. |
| 2008/0256936 A1* | 10/2008 | Zuberi ............... B01D 53/9413 60/299 |
| 2009/0107118 A1 | 4/2009 | Ruona |
| 2010/0101409 A1* | 4/2010 | Bromberg ............... F01N 3/025 95/8 |
| 2013/0045139 A1 | 2/2013 | Boger et al. |
| 2013/0047591 A1 | 2/2013 | Moehlmann et al. |
| 2013/0145747 A1* | 6/2013 | Bailey ..................... F01N 9/002 60/274 |
| 2015/0201224 A1 | 7/2015 | Krug |
| 2015/0204224 A1* | 7/2015 | Daido ................. F01N 13/0097 60/301 |
| 2016/0222898 A1 | 8/2016 | Ulrey et al. |

FOREIGN PATENT DOCUMENTS

| | | |
|---|---|---|
| EP | 2767690 A1 | 8/2014 |
| EP | 2955347 A1 | 12/2015 |
| GB | 2385012 A | 8/2003 |
| JP | 2013124576 A | 6/2013 |
| WO | 2008053462 A2 | 5/2008 |
| WO | 2012030278 A1 | 3/2012 |
| WO | 2014038724 A1 | 3/2014 |
| WO | 2014122340 A1 | 8/2014 |

OTHER PUBLICATIONS

International Search Report for International Patent Application No. PCT/SE2017/050049 dated Mar. 24, 2017.
Written Opinion of the International Searching Authority for International Patent Application No. PCT/SE2017/050049 dated Mar. 24, 2017.
Swedish Office Action of E1650173-6 dated Sep. 16, 2016 (no translation).
Scania CV AB, International Application No. PCT/SE2017/050049, International Preliminary Report on Patentability, dated Aug. 14, 2018.

* cited by examiner

USE OF A LUBRICATION OIL THAT FORMS WATER-SOLUBLE ASH WHEN COMBUSTED, ENGINE SYSTEM IN WHICH THE OIL IS USED AND A VEHICLE COMPRISING THE ENGINE SYSTEM

CROSS-REFERENCE TO RELATED APPLICATION(S)

This application is a National Stage Application (filed under 35 § U.S.C. 371) of PCT/SE2017/050049, filed Jan. 19, 2017 of the same title, which, in turn claims priority to Swedish Application No. 1650173-6 filed Feb. 11, 2016 of the same title; the contents of each of which are hereby incorporated by reference.

FIELD OF THE INVENTION

The present invention relates to a use of a lubrication oil that forms water-soluble ash when combusted in an engine system, an engine system in which the lubrication oil is used and a vehicle comprising the engine system.

BACKGROUND OF THE INVENTION

Diesel engines are provided with exhaust purification devices with the object of reducing particles and harmful gases which occur in diesel engine exhaust gases. To regulate emissions from vehicles there are various standards and legal requirements, which govern permissible levels for exhaust discharges. Vehicles are consequently provided with various kinds of purification devices for exhaust gases in an exhaust gas system in order to meet legal requirements. The exhaust gas system may be arranged for example in a silencer fluidly connected to an exhaust pipe system of a vehicle.

Silencers are used in internal combustion engines to damp engine noise and reduce emissions and are situated in the engine's exhaust system. Internal combustion engines provided with a silencer may be used in various different applications, e.g. in heavy vehicles such as trucks or buses. The vehicle may alternatively be a passenger car. Motorboats, ferries or ships, industrial engines and/or engine-powered industrial robots, power plants, e.g. an electric power plant provided with a diesel generator, locomotives or other applications may have combustion engines with silencers. The silencer comprises a diesel particulate filter (DPF), also called particulate filter in this context, for exhaust gas after treatment. The particulate filter is intended to catch particles, such as soot particles oxidized into ash. Usually, such a silencer is mounted primarily with regard to available space in the vehicle and without taking into account that the silencer should be dismantled easily, or be easily accessible when serviced. The particulate filter in the silencer may need to be dismantled in order to be replaced or cleaned of deposited ash, and, in connection therewith, the silencer also usually needs to be dismantled at least partly. This dismantling may become considerably difficult since the silencer may weigh between 100 to 150 kg and is not always easily accessible. The particulate filter itself needs to be replaced or cleaned at certain intervals since accumulated ash increases the back pressure in the exhaust system, which entails increased fuel consumption, for instance. In addition, the accumulated ash may render it difficult for the exhaust gases to get in contact with a catalytic coating in the oxidation catalyst, whereby oxidation of the soot particles into ash is obstructed. Therefore, the ash needs to be removed from the particulate filter.

Usually, the cleaning and/or replacement of the particulate filter takes place in connection with service, which typically entails dismantling of the silencer and the particulate filter with approximately one year's interval. In cases with high mileages, typically above 300 000-400 000 km, for a cargo vehicle with a diesel engine driven with alternative fuels, cleaning of the particulate filter may need to be carried out at even shorter intervals. The accumulated ash can be difficult to remove and different environmentally unfriendly solvents may be needed to remove the ash. Also the removal of ash may be laborious and time consuming. It is thus desirable that cleaning of the particulate filter is facilitated.

There have been several attempts in the prior art to facilitate cleaning of a particulate filter. For example, EP2767690A1 discloses a device for use in cleaning of a particulate filter comprising a disc unit having apertures and designed to let through air when cleaned through a suction device connected to the silencer sucking air through the opening and backwards through the particulate filter. However, it is desirable to avoid further components in the silencer that may increase the weight of the silencer.

WO2014038724 discloses a purification system in which a liquid is supplied to a particulate filter to promote movement of ash to rear parts of the particulate filter. The particulate matter, which is moved in this way, is then removed by a subsequent removal processing step. Thus, the particulate matter still needs to be removed from the particulate filter in a particular process step. The document WO 2008/053462 A1 describes an example of how cleaning a particulate filter in a silencer may occur without the filter having to be dismantled from the silencer. However, the particulate matter still needs to be removed from the particulate filter in a separate process. Further, DE4313132A1 discloses a cleaning method in which diesel particulate filter for an exhaust system of a diesel engine is cleaned of deposited particles by means of a rinsing liquid, which may be water. However, the cleaning method is performed in a separate process step in which water is lead to the particulate filter via a specific liquid inlet and whereby an interruption in the operation of the diesel engine is required.

Even though there are prior art solutions on how to remove particulate matter from particulate filters, there is still a need to improve removal procedures in the existing exhaust gas systems. There is also a great need for a high degree of exhaust gas purification in combustion engines.

SUMMARY OF THE INVENTION

In view of the problems above, it would be desirable to facilitate cleaning of the diesel particulate filters. The inventors of the present invention have also noted that it would be desirable to avoid the formation of large deposits of particulate matter that needs to be removed. Further, it would be desirable that as few interruptions as possible in the operation of the internal combustion engine are needed. In addition, it is desirable that the need for service occasions is minimized.

Thus, it is an object of the present invention to provide a solution for minimizing the amount of particulate matter that is deposited in a diesel particulate filter. It is a further object of the invention to provide a simple and automatic solution to clean the particulate filter from particulate matter. Further, it is an object to provide an engine system in which cleaning can occur often and regularly during the use of an internal combustion engine without a need to dismantle the particulate filter. Also, it is an objective of the present invention to decrease the number of service occasions.

The above-mentioned objectives are achieved with the invention as defined by the appended independent claims. Especially, the objectives are achieved according to a first aspect of the present invention, which relates to a use of a lubrication oil that forms water-soluble ash, when combusted in an engine system, the engine system comprising:

an internal combustion engine arranged to be operated by a fuel and to be lubricated by means of the lubrication oil forming water-soluble ash;

an exhaust gas system for cleaning exhaust gases from the internal combustion engine, the exhaust gas system comprising a diesel particulate filter arranged to capture particulate matter from the exhaust gases, wherein the particulate matter comprises the water-soluble ash, and an exhaust gas conduit arranged to lead exhaust gases from the internal combustion engine to the exhaust gas system, and arranged to collect condensed water formed by the cold start and/or cold operation of the internal combustion engine and lead the condensed water through the diesel particulate filter, thereby dissolving and thus removing the water-soluble ash from the diesel particulate filter.

In accordance with the present invention the lubrication oil used to lubricate the internal combustion engine forms water-soluble ash. This means that the engine oil comprises additives and optionally other compounds that render the ash water-soluble. By ash is meant the non-volatile products and residue formed when the lubrication oil, also referred to as an engine oil, is combusted. By water-soluble is meant that the ash is capable of being dissolved in water.

Preferably, the amount of the water-soluble ash formed from the lubrication oil is at least 80% by weight based on the total weight of the ash, preferably at least 90% by weight based on the total weight of the ash, most preferably at least 95% by weight based on the total weight of the ash. Most preferably, the ash is completely, i.e. 100%, water-soluble. Thus, the depositions of the particulate matter in the diesel particulate filter can be considerably decreased by means of using a lubrication oil forming water-soluble ash after combustion. Therefore, instead of using traditional lubrication oils that normally produce a relatively small amount of ash after combustion, but wherein the ash is not water-soluble, it has been realized that the depositions of particulate matter can be decreased since the ash is mostly or completely dissolved in condensed water formed during the cold start or operation of the vehicle. According to the invention, the exhaust gas conduit is arranged to collect the condensed water formed by the cold start/operation of the internal combustion engine and lead the condensed water through the diesel particulate filter, thereby dissolving and thus removing the ash that is water-soluble from the diesel particulate filter (DPF). Therefore, no constructional changes or only minor changes are required for the existing engine systems.

The present invention also relates to an an engine system comprising:

an internal combustion engine arranged to be operated by a fuel and to be lubricated by means of a lubrication oil that forms water-soluble ash when combusted;

an exhaust gas system for cleaning an exhaust gas flow from the internal combustion engine, the exhaust gas system comprising a diesel particulate filter arranged to capture particulate matter from the exhaust gases, wherein the particulate matter comprises the water-soluble ash, and an exhaust gas conduit arranged to lead exhaust gases from the internal combustion engine through the exhaust gas system and arranged to collect condensed water formed by the cold start and/or cold operation of the internal combustion engine and lead the condensed water through the diesel particulate filter, thereby dissolving and thus removing the water-soluble ash from the diesel particulate filter.

Thereby, the engine system of the present invention is customized for the use of lubrication oil forming a water-soluble ash after combustion. By using an engine oil, which forms water-soluble ash in combination with the utilization of condensed water formed during cold operation of an internal combustion engine in the engine system as defined above, it is possible to decrease the amount of deposited ash in the DPF. Since the cold start of the engine is normally performed daily, condensed water will flush the DPF daily and thus at least a part of the ash accumulated in the DPF will be dissolved in the water and therefore the DPF will be automatically cleaned. Therefore, an effective in-situ cleaning of the diesel particulate filter can be provided. This is a huge advantage, which will reduce the amount of particulate matter that is deposited in the particulate filter. Also, no constructional changes are required for the existing engine systems while cleaning can occur often and regularly during the normal use of the internal combustion engine without a need to dismantle the particulate filter. Also, in this way it is possible to decrease the amount of service occasions.

In some occasions it may be desirable to increase the amount of condensed water. The amount may be increased by means of controlling the operation of the internal combustion engine or the engine system by means of a control system connected to the internal combustion engine such that an increased amount of condensed water is formed. Suitably, the control system may be arranged to increase the fuel-air ratio during the cold operation and/or the cold start of the internal combustion engine and therefore increase the amount of condensed water. The fuel-air ratio may be adjusted by for example controlling the operation of the internal combustion engine during the cold start/cold operation such that the fuel/air ratio is kept high while the number of revolutions is kept low. As a result, more condensed water will be obtained, since high fuel-air ratio increases the quota of water in the exhaust gases and low temperature of the exhaust gases provides more condensed water. Alternatively or additionally the amount of condensed water may be increased by adjusting, suitably by decreasing, the amount of fresh air that flows into the internal combustion engine via an intake manifold by means of an intake throttle arranged upstream of the intake manifold. Further, as an example, it is possible to increase the amount of condensed water by decreasing the temperature the exhaust gases. This can be done for example by means of an exhaust gas recirculation (EGR) arrangement arranged in fluid connection with the exhaust gas conduit and the intake manifold. At least part of the exhaust gas flow from the internal combustion engine can be recirculated from the exhaust gas conduit through the EGR, which comprises an EGR cooler which reduces the temperature of the EGR gases. As mentioned above, low temperature of the exhaust gases provides more condensed water. Therefore it can be assured that the DPF will be flushed with a larger amount of condensed water than during a normal cold operation of the vehicle and thus the amount of accumulated ash in the DPF can be effectively decreased.

The exhaust gas system may further comprise a first sensor arranged upstream of the diesel particulate filter for measuring a pressure drop over the diesel particulate filter or for measuring the pressure of the exhaust gas flow before filtration. The first sensor is connected to the control system. The first sensor may be a differential pressure transmitter that measures the pressure drop over the diesel particulate filter. Differential pressure transmitters are devices that measure the difference in pressure between two points. Such transmitters are available on the market by several suppliers and are known to the skilled person. According to another variant, the first sensor measures the pressure of the exhaust gas flow before filtration. Thus, it will be possible to indicate any abnormal increase in the pressure caused by depositions of particulate matter in the diesel particulate filter.

The control system comprises preferably means arranged to compare the measured pressure drop value or the value for the pressure of the exhaust gas flow with a predetermined value for the pressure drop or the pressure of the exhaust gas flow and create an error code if the pressure drop value or the pressure value differs from the predetermined value. In this way, it will be possible to command the engine system to produce an increased amount of condensed water during the cold start or cold operation of the engine or alternatively send an error signal indicating that service is required.

The exhaust gas system may further comprise a second sensor for measuring the pressure of the exhaust gas flow. The second sensor may be arranged downstream of the diesel particulate filter to measure the pressure after filtration. The second sensor is connected to the control system.

The first sensor preferably comprises, or the first and second sensors comprise, means arranged to generate a measuring signal comprising data relating to the measured pressure value or pressure drop value. The control system comprises means for receiving the measuring signals from the first sensor and/or the second sensor, respectively. In this way, it will be possible to utilize the measured data in the control system in an advantageous way.

The control system preferably comprises means arranged to calculate a pressure drop over the diesel particulate filter from the received measuring signal from the first sensor and the second sensor. The control system preferably comprises means arranged to compare the calculated pressure drop value with a predetermined pressure drop value and create an error code if the measured pressure drop value differs from the predetermined value.

Preferably, the control system comprises means arranged to control the internal combustion engine or the engine system based on the measured or calculated pressure drop value or value for the pressure of the exhaust gas flow so as to increase an amount of condensed water.

In case there are depositions of particulate matter in the diesel particulate filter, the pressure drop over the diesel particulate filter will be greater than in case there are no depositions. Alternatively or additionally the pressure of the exhaust gas flow will increase upstream of the diesel particulate filter. The measured or calculated pressure drop or pressure value is then compared with the pre-determined pressure drop or pressure values and an error code is created if the measured or calculated values differ from the predetermined values. For example, in case of higher pressure drop or pressure values than the pre-determined values, the control system may command the engine system to produce an increased amount of condensed water during the next cold start or alternatively send an error signal indicating that service is required.

By means of using a measurement indicating or calculating a pressure drop over the diesel particulate filter or by measuring the pressure of the exhaust gas flow before filtration, it is possible to get an indication of depositions of particulate matter in the diesel particulate filter in an effective way. Thus, it will be possible for the control system to command the engine system to produce an increased amount of condensed water during the next cold start or alternatively send an error signal indicating that service is required.

The control system may be adapted to receive the measuring signals continuously. It is also possible that the control system is adapted to receive the measuring signals periodically, i.e. for example at certain intervals or in case of manually controlled random intervals. An example of a random interval is for example at start of the engine or vehicle.

Preferably, the first sensor and/or second sensor are connected to the control unit via a communication bus, such as CAN-bus. Thus, the pressure measurements may be made a part of the total control system of the vehicle.

The invention also relates to a vehicle comprising the engine system as defined above.

Further objects, advantages and features of the invention are described in the following detailed description.

DETAILED DESCRIPTION OF THE INVENTION

As mentioned above, combustion engines are used in various types of applications and vehicles today, e.g. in heavy vehicles such as trucks or buses, in cars, motorboats, ferries or ships. They may also be used in industrial engines and/or engine-powered industrial robots, power plants, e.g. electric power plants provided with a diesel generator, and in locomotives. The engine system according to the present invention is intended for an internal combustion engine, which is fluidly connected to an exhaust gas system by means of an exhaust gas conduit or pipe. The engine system may be employed for example in a vehicle, e.g. in a truck or bus. The exhaust gas system of the engine system can be placed in a silencer or components of the exhaust gas system may be arranged in another way, for example in a series of components and they do not need to be arranged in a silencer. For example in case of buses, it may be difficult to place the exhaust gas system in a silencer, since the floor of the bus needs to be low and/or the bus must contain a maximal amount of seats, whereby bulky silencers are difficult to place in a bus.

Figure 1:
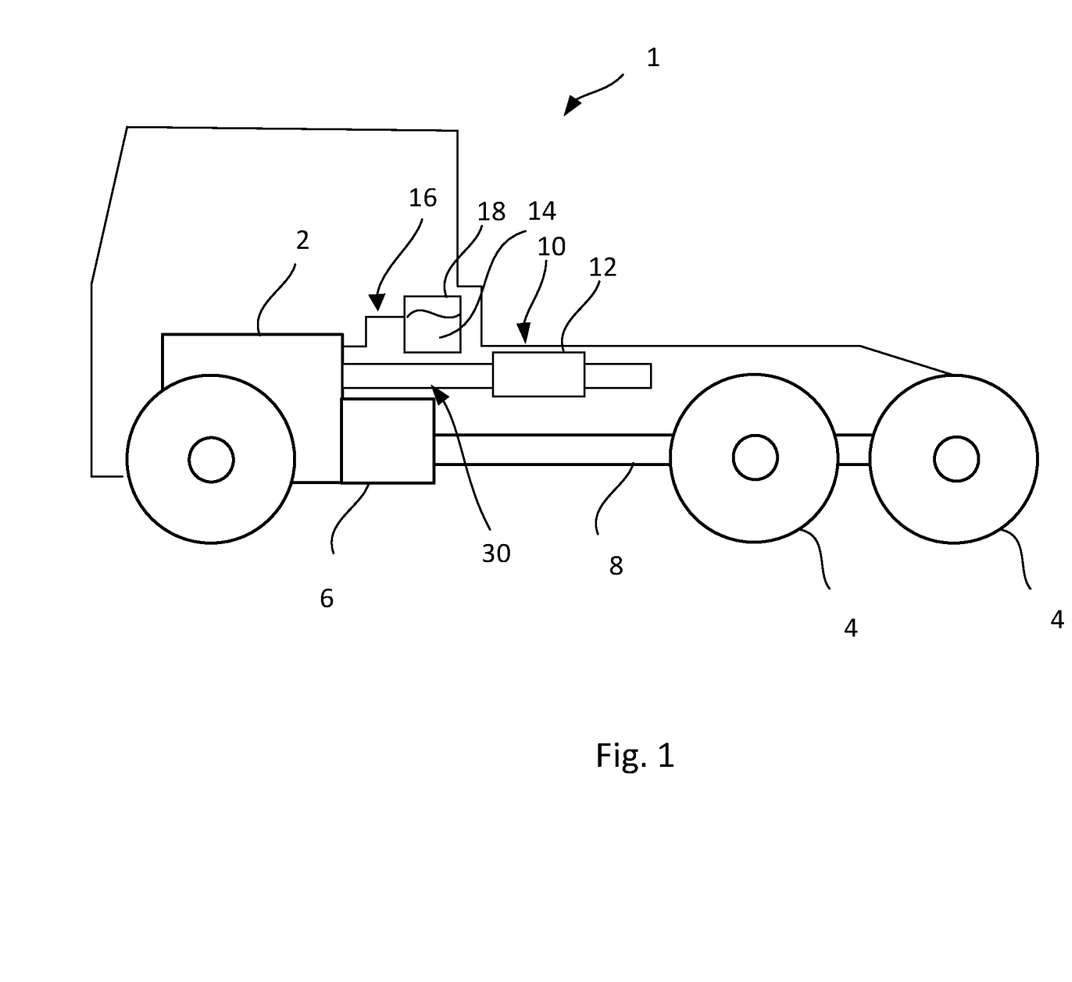
FIG. 1 is a schematic side view of a vehicle comprising an engine system according to the present invention.

In FIG. 1 an example of a vehicle 1 comprising an engine system 30 comprising an internal combustion engine 2 and an exhaust gas system 10 is shown in a schematic side view. The internal combustion engine 2 powers the vehicle's tractive wheels 4 via a gearbox 6 and a propeller shaft 8. The internal combustion engine 2 is arranged in fluid connection with an exhaust gas system 10, which is fitted at least partly in a silencer 12. The exhaust gas system 10 may further comprise additional exhaust gas pipes, exhaust manifold and a control system, for example. The internal combustion engine 2 is powered by fuel 14 supplied to it via a fuel system 16 which comprises a fuel tank 18. The fuel is suitably diesel, such as biodiesel or a corresponding fuel.

The internal combustion engine 2 is lubricated by means of an engine oil, which according to the present invention forms a water-soluble ash when combusted.

The internal combustion engine of the present invention is suitably a diesel engine. The internal combustion engine is arranged to be operated by a fuel and to be lubricated by means of a lubrication oil that forms water-soluble ash when combusted. The lubrication oil contains at least one additive that renders the ash formed after combustion water-soluble. Such oils can be easily determined and they can be classified as forming water-soluble ash. The engine system of the present invention is customized for the lubrication oils forming water-soluble ash. The lubrication oils suitable for use in the customized engine system of the present invention can then be specified for the users. The fuel can be any of the known kinds, such as petroleum diesel, synthetic diesel or biodiesel, also called fatty-acid methyl ester (FAME) which is obtained from vegetable oil or animal fats that have been transesterified with methanol. The fuel may also be a hydrogenated oil or fat or dimethyl ether, DME.

The lubrication oil forms a water-soluble ash when burned. The solubility of the ash may be determined by for example ISO 1576:1988. Lubrication oils can be arranged to form water-soluble ash for example by means of using additives that form water-soluble compounds in ash. For example, sulphate salt of magnesium is water-soluble and by choosing additives that form $MgSO_4$ as an ash, will render the ash water-soluble. According to the present invention it is essential that the ash is water-soluble but it is not essential how the water-solubility is achieved. Thus, any additive forming a water-soluble ash can be chosen. The amount of the water-soluble ash formed from the lubrication oil is at least 80% by weight based on the total weight of the ash, preferably at least 90% by weight based on the total weight of the ash, most preferably at least 95% by weight based on the total weight of the ash.

The engine system of the present invention utilizes the water-soluble ash and water condensed during the operation of the engine system. The engine system comprises an internal combustion engine and an exhaust gas system, which can be arranged in a silencer. The silencer in which at least part of the exhaust gas system is accommodated comprises a casing comprising at least one inlet for leading an exhaust gas flow into the silencer. The silencer may comprise several inlets. The exhaust gas system may also comprise a diesel oxidation catalyst (DOC) which can be arranged downstream of the inlet in a silencer. The DOC is a unit designed to oxidize the exhaust gases. DPF is a unit designed to remove diesel particulate matter or soot from the exhaust gas flow. The DPF can for example be a catalysed soot filter (CSF). The soot is further oxidized or burned-off to ash in the particulate filter, e.g. during regeneration of the particulate filter. The diesel particulate filter may be regenerated with or without a catalyst. The regeneration can then be performed by means of the heat from the engine's normal operation.

The exhaust gas system can further comprise a selective catalytic reduction (SCR) purification system, which comprises an injection arrangement for adding a reducing agent to the exhaust gas flow in order to reduce $NO_x$ contents of the exhaust gas flow. The reducing agent may be for example a mixture of water and urea, e.g. a product with a trade name AdBlue®, which comprises a mixture of 32.5% urea in water. The exhaust gas flow and the reducing agent are mixed and vaporized in a vaporization chamber which is arranged downstream of the injection arrangement. Further, a selective catalytic reduction (SCR)- catalyst is arranged downstream of the vaporization chamber. The SCR- catalyst may comprise vanadium, iron or copper catalyst in which $NO_x$ is converted to water vapour and nitrogen. An ammonia slip catalyst (ASC), which is a unit designed to convert any $NH_3$ slip to $N_2$ and $H_2O$, may be arranged downstream of the SCR-purification system. All these components may be arranged as separate components in series or in a silencer. In case the components are arranged in a silencer, an outlet for leading the exhaust gas flow out from the silencer is arranged downstream of the SCR- catalyst and possible ASC. The silencer may comprise several outlets.

The exhaust gas system, or the silencer comprising the exhaust gas system, does not necessarily need to comprise a DOC and/or an ASC. On the other hand, the exhaust gas system may comprise one or more of each of DOC and ASC together with DPF. In case the exhaust gas system does not comprise a DOC, the exhaust gas flow is arranged to flow to the DPF. If the silencer comprises a DOC and a DPF, the exhaust gas flow is arranged to flow through the DOC to the DPF. The exhaust gas flow is arranged to flow through the DPF to the injection arrangement if the silencer comprises a DPF and not a DOC. If the exhaust gas system does not comprise an ASC the exhaust gas is arranged to flow from the SCR purification system to an outlet of the exhaust gas system of the silencer.

Figure 2:
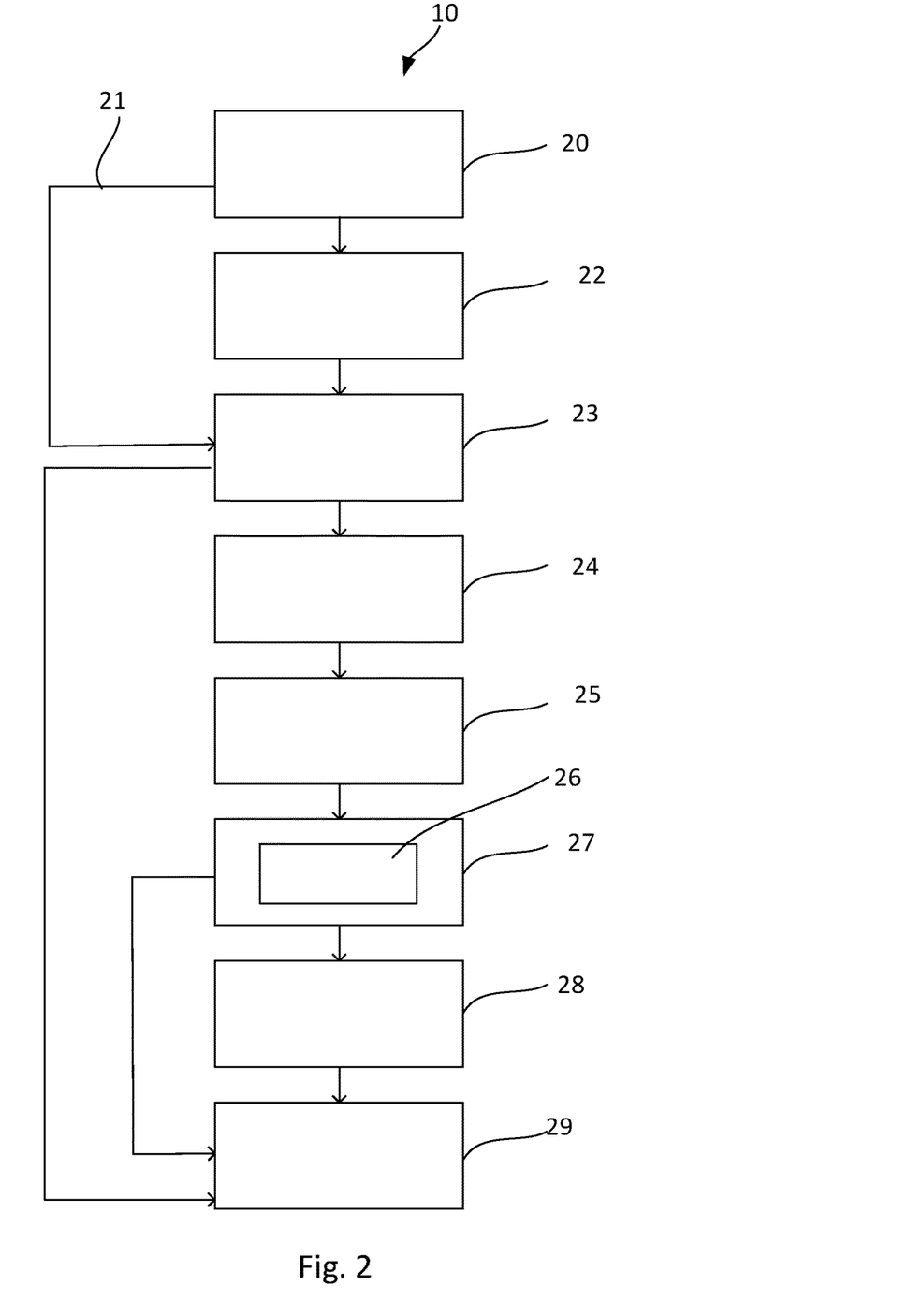
FIG. 2 is a schematic drawing showing path of the exhaust gas flow through an exhaust gas system.

FIG. 2 depicts schematically examples of possible ways the flow of exhaust gases can flow through an exhaust gas system 10. The arrows in FIG. 2 illustrate the flow 21 of exhaust gases, but the reference number 21 is only attached to one of the arrows. The exhaust gas system 10 comprises an inlet 20 for leading an exhaust gas flow 21 into the exhaust gas system 10 and a diesel oxidation catalyst (DOC) 22 is arranged downstream of the inlet 20. A diesel particulate filter (DPF) 23 is arranged downstream of the DOC 22 and the DPF 23 can for example be a catalysed soot filter (CSF). The exhaust gas flow may be arranged to flow directly from the DPF 23 to an outlet 29 of the exhaust gas system 10 or the exhaust gas flow may be arranged to flow to an injection arrangement 24, which is arranged downstream of the DPF 23 for adding a reducing agent to the exhaust gas flow 21 in order to reduce $NO_x$ contents of the exhaust gas flow 22. A vaporization chamber 25 for vaporization of the reducing agent, is arranged downstream of the injection arrangement 24. A selective catalytic reduction (SCR)- purification system 27 comprising a SCR-catalyst 26 is arranged downstream of the vaporization chamber 25. An ammonia slip catalyst (ASC) 28 may be arranged downstream of the SCR-purification system 27 and an outlet 29 for leading the exhaust gas flow 21 out from the exhaust gas system 10 is arranged downstream of the ASC 28.

In case the exhaust gas system 10 does not comprise a DOC 22, the exhaust gas flow 21 is arranged to flow from the inlet 20 to the injection arrangement 24 via DPF 23. If the exhaust gas system 10 does not comprise an ASC 28 the exhaust gas flow 21 is arranged to flow from the SCR purification system 27 to the outlet 29.

The internal combustion engine comprises an air intake manifold leading air to the cylinders of the internal combustion engine. An intake throttle is arranged upstream of the air intake manifold for adjusting fresh air flow into the intake manifold. By adjusting the amount of fresh air to the internal combustion engine, it is possible to increase the amount of condensed water.

The engine system may further comprise an exhaust gas recirculation (EGR) which is used to reduce the combustion temperature. This means that part of the engine's exhaust gases is recirculated back to the intake manifold of the engine. The EGR is arranged in fluid connection with the exhaust pipe and the intake manifold, such that at least part of the exhaust gas flow can be recirculated from the exhaust pipe through the EGR to the intake manifold downstream of the intake throttle. The EGR comprises an EGR cooler, which reduces the temperature of the EGR gases that are recirculated back to the air intake manifold.

Figure 3:
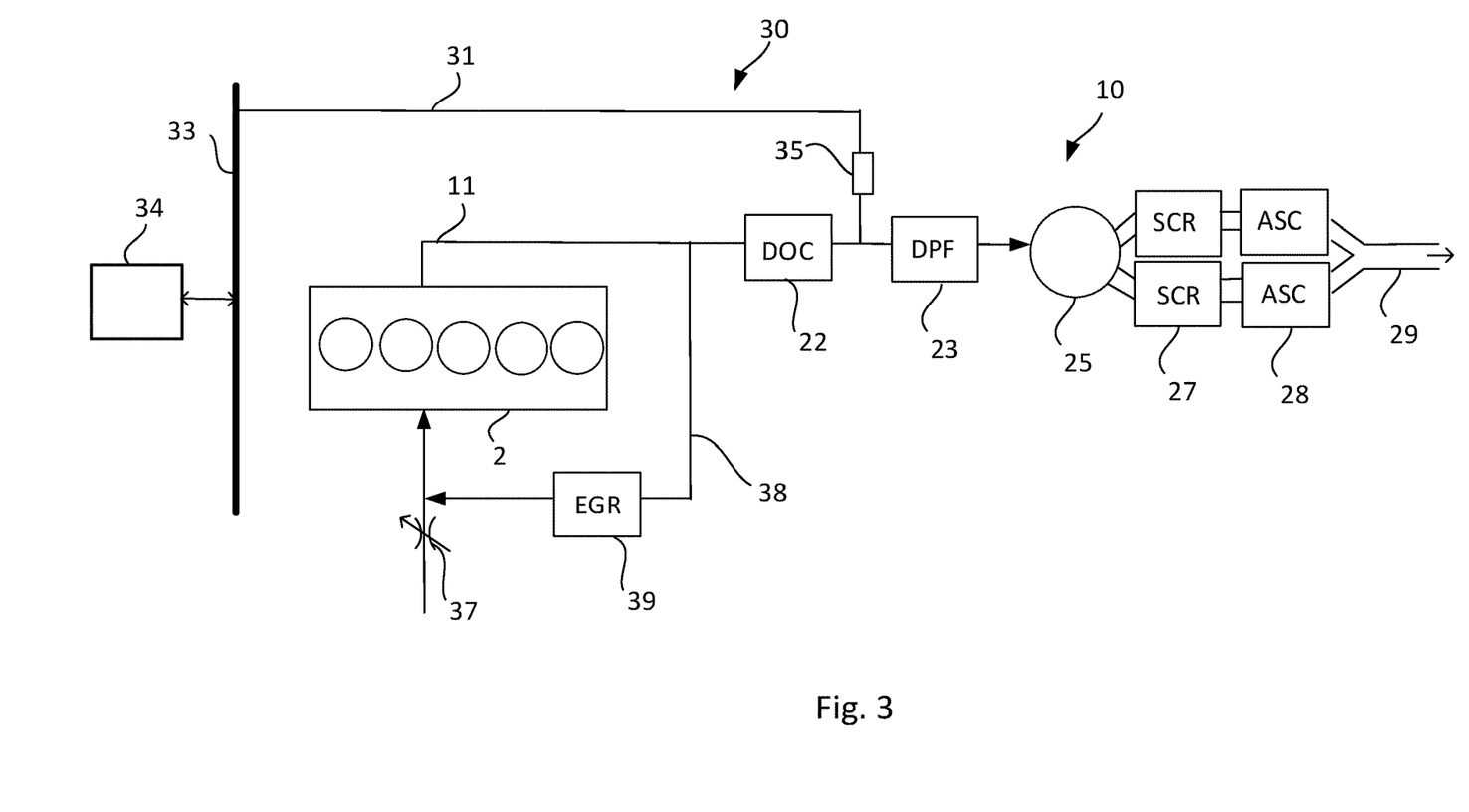
FIG. 3 is a schematic drawing showing an engine system according to one embodiment of the present invention.

FIG. 3 shows a schematically an engine system 30 according to one variant of the present invention. The engine system 30 comprises an internal combustion engine 2 in fluid connection with the exhaust gas system 10 as described above by means of an exhaust gas conduit 11. The exhaust gas system comprises DOC 22, DPF 23, vaporization chamber 25 fluidly connected to an injection arrangement (not shown), SCR-purification system 27 and ASC 28. The exhaust gases are arranged to flow out from the exhaust gas system 10 via an outlet 29.

An air intake throttle 37 is arranged to adjust the amount of intake air to the internal combustion engine via an air intake manifold (not shown). Downstream of the internal combustion engine, the exhaust gas conduit 11 is fluidly connected to an exhaust gas recirculation system via an EGR conduit 38. The exhaust gases are cooled by leading the exhaust gas flow through an EGR cooler 39 back to the internal combustion engine 2 downstream of the air intake throttle 37.

A first sensor 35 for measuring the pressure of the exhaust gas flow is arranged downstream of the DOC 22 and upstream of the DPF 23. As shown in more detail in FIG. 3, the first sensor 35, i.e. a pressure measurement device, is connected to a communication bus 33, such as CAN-bus, via a connection 31, and preferably, the CAN-bus 33 communicates with a control system 34 of the vehicle. The first sensor 35 is arranged to generate a measuring signal comprising data relating to the measured pressure value. The first sensor may be arranged to measure the pressure upstream of the DPF 23 or it may be a differential pressure transmitter that measures a pressure drop over the DPF 23. The control system 34 comprises means for receiving the measuring signal from the first sensor 35. The control system 34 further comprises means arranged to compare the received measuring signal from the first sensor 35 with a predetermined pressure value and create an error code if the measured pressure differs from the predetermined value. In this way, the operator of the vehicle will get an indication that the DPF needs to be cleaned or changed. Also the control system 34 may control the internal combustion engine 2 so as to increase the amount of condensed water during the cold operation and/or the cold start, whereby it is possible to improve the cleaning effect since more ash can be dissolved in the increased amount of condensed water.

Figure 4:
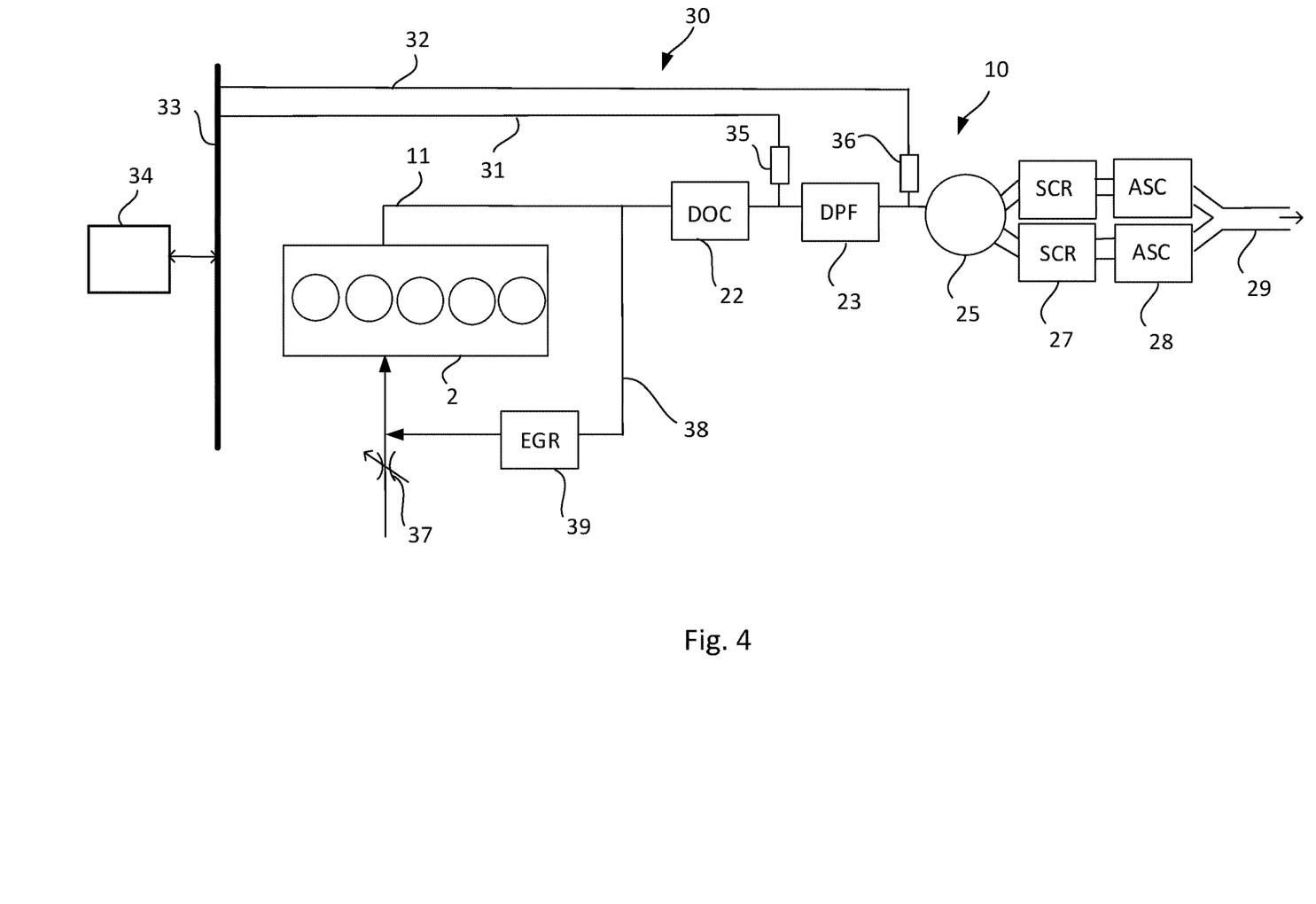
FIG. 4 is a schematic drawing showing an engine system according to another embodiment of the present invention.

In another variant of the invention as shown in FIG. 4 it is alternatively or additionally to the first variant described in FIG. 3 possible to evaluate pressure drop over the DPF by means of two sensors. The system in FIG. 4 corresponds to the system in FIG. 3 except that a second sensor 36 for measuring the pressure of the exhaust gas flow is arranged downstream of the DPF 23 to indicate the pressure after filtration of the particulate matter in the DPF. The second sensor 36 is also connected to the communication bus 33, such as CAN-bus, via a connection 32, and the CAN-bus 33 communicates with the control system 34 of the vehicle. In this embodiment of the invention, the control system 34 comprises means arranged to calculate the pressure drop from the received measuring signals from the first sensor 35 and the received measuring signal from the second sensor 36. The control system 34 is arranged to compare the calculated pressure drop value with a predetermined value for the pressure drop and create an error code if the calculated pressure drop differs from the predetermined pressure drop. In this way it can be controlled that the pressure drop is acceptable. Thus, the accuracy of the system can be further improved. Therefore, it is possible for the control system 34 to control the internal combustion engine 2 so as to increase the amount of condensed water during the cold operation and/or the cold start. Alternatively it is possible to warn the operator of the vehicle that the DPF needs to replaced or cleaned at service as soon as possible.

In both engine systems shown in FIGS. 3 and 4, the amount of condensed water may be increased in a similar manner. The amount may be increased by means of control of the operation of the internal combustion engine 2 or the engine system 30 by means of the control system 34 connected to the internal combustion engine 2 such that an increased amount of condensed water is formed. Suitably, the control system 34 may be arranged to increase the fuel-air ratio during the cold operation and/or the cold start of the internal combustion engine and therefore increase the amount of condensed water.

The fuel-air ratio may be adjusted by for example by controlling the operation of the internal combustion engine 2 during the cold start/cold operation such that the fuel/air ratio is kept high while the number of revolutions is kept low. As a result, more condensed water will be obtained, since high fuel-air ratio increases the quota of water in the exhaust gases and low temperature of the exhaust gases provides more condensed water. Alternatively or additionally the amount of condensed water may be increased by adjusting the amount of fresh air that flows into the internal combustion engine 2 via an intake manifold by means of an intake throttle 37 arranged upstream of the intake manifold. Further, it is possible to increase the amount of condensed water by decreasing the temperature the exhaust gases. This can be done for example by means of an exhaust gas recirculation (EGR) arrangement arranged in fluid connection with the exhaust conduit 11 and the intake manifold. At least part of the exhaust gas flow from the internal combustion engine can be recirculated from the exhaust pipe 11 through the EGR pipe 38, which comprises an EGR cooler 39 which reduces the temperature of the EGR gases. As mentioned above, low temperature of the exhaust gases provides more condensed water. Therefore, it can be assured that the DPF 23 will be flushed with a larger amount of condensed water than during a normal cold operation of the vehicle and thus the amount of the accumulated ash in the DPF 23 can be effectively decreased.

The control system 34 may be adapted to receive the measuring signals from the first and/or the second sensor 36 continuously. It is also possible that the control system 34 is adapted to receive the measuring signals periodically, i.e. for example at certain intervals or in case of manually controlled random intervals. An example of a random interval is for example at start of the engine or vehicle.

Generally the control system 34 comprises or is connected to a CAN bus 33, as shown in FIGS. 3 and 4, and comprises one or more communication busses to interconnect a number of electronic control units (ECUs), or controllers, and various components of the vehicle 1. Such a control system 34 may comprise a large number of control units. The control system 34 function may be arranged to receive signals from various sensors in the vehicle and thus control the vehicle accordingly. Further, the control of the vehicle can be performed by programmed instructions. These programmed instructions typically include a computer program, which when the program code is executed in a computer, achieves that said computer carries out the desired action such as the steps of the present invention described above.

It should be understood that the examples described above in connection with FIG. 1-4 are to be regarded as example not limiting the scope of the invention, which is defined in the appended claims.

The invention claimed is:

1. An engine system comprising:
an internal combustion engine arranged to be operated by a fuel and to be lubricated by a lubrication oil comprising at least one additive that renders an ash formed by combustion of the lubrication oil in the engine system forming into water-soluble ash when combusted in the engine system;
an exhaust gas system for cleaning exhaust gases from the internal combustion engine, the exhaust gas system comprising a diesel particulate filter arranged to capture particulate matter from the exhaust gases, wherein the particulate matter comprises the water-soluble ash; and
an exhaust gas conduit arranged to lead exhaust gases from the internal combustion engine to the exhaust gas system, and arranged to collect condensed water formed by a cold start and/or a cold operation of the internal combustion engine and lead the condensed water through the diesel particulate filter thereby dissolving and thus removing the water-soluble ash from the diesel particulate filter.

2. An engine system according to claim 1, wherein the amount of the condensed water is arranged to be increased by controlling the operation of the internal combustion engine using a control system connected to the internal combustion engine.

3. An engine system according to claim 2, wherein the control system is arranged to increase a fuel-air ratio during the cold operation and/or the cold start of the internal combustion engine.

4. An engine system according to claim 2, or wherein the exhaust gas system further comprises a first sensor arranged upstream of the diesel particulate filter for measuring a pressure drop over the diesel particulate filter or a pressure of the exhaust gas flow before filtration, and the first sensor is connected to the control system.

5. An engine system according to claim 4, wherein the control system comprises means arranged to compare the measured pressure drop value or the value for the pressure of the exhaust gas flow with a predetermined value for the pressure drop or the pressure of the exhaust gas flow and create an error code if the pressure drop value or the pressure value differs from the predetermined value.

6. An engine system according to claim 4, wherein the exhaust gas system further comprises a second sensor arranged downstream of the diesel particulate filter for measuring a flow pressure of the exhaust gas flow after filtration and wherein the second sensor is connected to the control system.

7. An engine system according to claim 6, wherein the control system comprises means arranged to calculate a pressure drop over the diesel particulate filter from the received measuring signal from the first sensor and the second sensor.

8. An engine system according to claim 7, wherein the control system comprises means arranged to compare the calculated pressure drop value with a predetermined pressure drop value and create an error code if the measured pressure drop value differs from the predetermined value.

9. An engine system according to claim 4, wherein the control system comprises means arranged to control the internal combustion engine or the engine system based on the measured or calculated pressure drop value or value for the pressure of the exhaust gas flow so as to increase an amount of condensed water.

10. A vehicle comprising: an engine system comprising:
an internal combustion engine arranged to be operated by a fuel and to be lubricated by a lubrication oil comprising at least one additive that renders an ash formed by combustion of the lubrication oil in the engine system forming into water-soluble ash when combusted in the engine system;
an exhaust gas system for cleaning exhaust gases from the internal combustion engine, the exhaust gas system comprising a diesel particulate filter arranged to capture particulate matter from the exhaust gases, wherein the particulate matter comprises the water-soluble ash; and
an exhaust gas conduit arranged to lead exhaust gases from the internal combustion engine to the exhaust gas system, and arranged to collect condensed water formed by a cold start and/or a cold operation of the internal combustion engine and lead the condensed water through the diesel particulate filter, thereby dissolving and thus removing the water-soluble ash from the diesel particulate filter.

11. A vehicle according to claim 10, wherein the amount of the condensed water is arranged to be increased by controlling the operation of the internal combustion engine using a control system connected to the internal combustion engine.

12. A vehicle according to claim 11, wherein the control system is arranged to increase a fuel-air ratio during the cold operation and/or the cold start of the internal combustion engine.

13. A vehicle according to claim 11, wherein the exhaust gas system further comprises a first sensor arranged upstream of the diesel particulate filter for measuring a pressure drop over the diesel particulate filter or a pressure of the exhaust gas flow before filtration, and the first sensor is connected to the control system.

14. A vehicle according to claim 13, wherein the control system comprises means arranged to compare the measured pressure drop value or the value for the pressure of the exhaust gas flow with a predetermined value for the pressure drop or the pressure of the exhaust gas flow and create an error code if the pressure drop value or the pressure value differs from the predetermined value.

15. A vehicle according to claim 13, wherein the exhaust gas system further comprises a second sensor arranged downstream of the diesel particulate filter for measuring a flow pressure of the exhaust gas flow after filtration and wherein the second sensor is connected to the control system.

16. A vehicle according to claim 15, wherein the control system comprises means arranged to calculate a pressure drop over the diesel particulate filter from the received measuring signal from the first sensor and the second sensor.

17. A vehicle according to claim 16, wherein the control system comprises means arranged to compare the calculated pressure drop value with a predetermined pressure drop value and create an error code if the measured pressure drop value differs from the predetermined value.

18. A vehicle according to claim 13, wherein the control system comprises means arranged to control the internal combustion engine or the engine system based on the measured or calculated pressure drop value or value for the pressure of the exhaust gas flow so as to increase an amount of condensed water.

19. A method for use in an engine system, where the engine system comprises:
- an internal combustion engine; an exhaust gas system for cleaning exhaust gases from the internal combustion engine, the exhaust gas system comprising a diesel particulate filter arranged to capture particulate matter from the exhaust gases; and an exhaust gas conduit arranged to lead exhaust gases from the internal combustion engine to the exhaust gas system, and arranged to collect condensed water formed by a cold start and/or a cold operation of the internal combustion engine and lead the condensed water through the diesel particulate filter, said method comprising:
- providing a lubrication oil for use in the engine system, wherein said lubrication oil comprises at least one additive that renders an ash formed by combustion of the lubrication oil in the engine system water-soluble when combusted in the engine system, such that particulate matter captured by said diesel particulate filter from the exhaust gases comprises the water-soluble ash, and such that condensed water led through the diesel particulate filter by said exhaust conduit dissolves and thus removes the water-soluble ash from the diesel particulate filter.

* * * * *